(12) United States Patent
Manabe

(10) Patent No.: US 11,657,246 B2
(45) Date of Patent: May 23, 2023

(54) INFORMATION PROCESSING APPARATUS, CONTROL METHOD OF THE SAME, AND STORAGE MEDIUM

(71) Applicant: CANON KABUSHIKI KAISHA, Tokyo (JP)

(72) Inventor: Koichiro Manabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/023,613

(22) Filed: Sep. 17, 2020

(65) Prior Publication Data

US 2021/0081732 A1    Mar. 18, 2021

(30) Foreign Application Priority Data

Sep. 18, 2019   (JP) .............................. JP2019-169581

(51) Int. Cl.
| | | |
|---|---|---|
| G06K 15/02 | (2006.01) | |
| H04N 1/00 | (2006.01) | |
| G06F 3/12 | (2006.01) | |
| G06K 15/00 | (2006.01) | |

(52) U.S. Cl.
CPC ......... G06K 15/408 (2013.01); G06K 15/002 (2013.01); G06K 15/1809 (2013.01)

(58) Field of Classification Search
None
See application file for complete search history.

(56) References Cited

U.S. PATENT DOCUMENTS

| | | | | | |
|---|---|---|---|---|---|
| 4,561,103 | A * | 12/1985 | Horiguchi | ........... | B41F 33/0036 |
| | | | | | 348/88 |
| 7,436,532 | B2 * | 10/2008 | Tsujimoto | ............ | G06K 15/005 |
| | | | | | 358/1.15 |
| 8,817,292 | B1 * | 8/2014 | Rodriguez | ............ | G06F 3/1256 |
| | | | | | 358/1.14 |
| 2004/0208500 | A1 * | 10/2004 | Kiyosu | .................. | G06Q 10/06 |
| | | | | | 396/549 |
| 2007/0086050 | A1 * | 4/2007 | Matsuda | ............ | H04N 1/33307 |
| | | | | | 358/1.14 |
| 2009/0002741 | A1 * | 1/2009 | Ozawa | .................. | G06F 3/1247 |
| | | | | | 358/1.13 |
| 2009/0303502 | A1 * | 12/2009 | Robinson | ............. | H04N 1/2307 |
| | | | | | 358/1.9 |
| 2010/0064176 | A1 * | 3/2010 | Negishi | ................. | G06F 3/1288 |
| | | | | | 714/37 |
| 2010/0085587 | A1 * | 4/2010 | Hayward | ............. | H04N 1/6033 |
| | | | | | 358/1.9 |

(Continued)

FOREIGN PATENT DOCUMENTS

| | | | |
|---|---|---|---|
| JP | 2014-215953 A | 11/2014 | |
| JP | 2018133670 | * 8/2018 | ............... H04N 1/46 |
| WO | WO 2020130024 | * 6/2020 | ............... G06F 3/12 |

*Primary Examiner* — Beniyam Menberu
(74) *Attorney, Agent, or Firm* — Venable LLP

(57) ABSTRACT

An information processing apparatus interprets quality requirement data of a print job received externally, analyzes print data of the print job, and compares an interpretation result of the quality requirement data and an analysis result of the print data. As a result of the comparison, in a case where an object, which is comprised in a print image, corresponding to the quality requirement data of the print job and the print data are inconsistent, a warning screen is displayed.

17 Claims, 10 Drawing Sheets

(56) References Cited

U.S. PATENT DOCUMENTS

| | | | |
|---|---|---|---|
| 2015/0324158 A1* | 11/2015 | Harada | G06F 3/1276 358/1.15 |
| 2017/0068875 A1* | 3/2017 | Gerrits | G06F 3/1285 |
| 2018/0250950 A1* | 9/2018 | Soh | B41J 2/36 |
| 2019/0236347 A1* | 8/2019 | Guzman | G06F 16/908 |

* cited by examiner

FIG. 4

```
· <ColorParameter>
  - <ParameterName>SpotColorRed</ParameterName>
  - <SamplingPosition>
      · <SamplingPositionMatrix>
          · <UoM>mm</UoM>
          · <Origin>BL</Origin>
          · <PositionDefinition PositionLabel="BottomMark">
              · <XPosition>0</XPosition>
              · <YPosition>0</YPosition>
          · </PositionDefinition>
      · </SamplingPositionMatrix>
  - </SamplingPosition>
  - <ChartType>IT8.7/1</ChartType>
  - <CxFReferenceObjectIdLink>
    CxF002
    </CxFReferenceObjectIdLink>
· </ColorParameter>
```

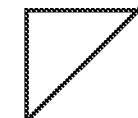
4a

```
· <BarcodeParameter>
  - <BarcodeSymbology>QRcode</BarcodeSymbology>
  - <SamplingPosition>
      · <SamplingPositionImageIdLink>
        BC2
        </SamplingPositionImageIdLink>
  - </SamplingPosition>
· </BarcodeParameter>
```

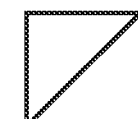
4b

FIG. 5

```xml
<CxFReferenceData>
  <cc:CxF>
    <cc:FileInformation>
    <cc:Resources>
      <cc:ObjectCollection>
        <cc:Object Name="1" Id="CxF001" ObjectType="Target">
        <cc:Object Name="2" Id="CxF002" ObjectType="Target">
          <cc:CreationDate>2007-06-14T00:00:00-08:00</cc:CreationDate>
          <cc:ColorValues>
            <cc:ColorCIELab ColorSpecification="CSI">
              <cc:L>47.83558</cc:L>
              <cc:A>63.29078</cc:A>
              <cc:B>36.27213</cc:B>
            </cc:ColorCIELab>
            <cc:ColorSRGB ColorSpecification="CSI">
              <cc:R>255</cc:R>
              <cc:G>0</cc:G>
              <cc:B>0</cc:B>
            </cc:ColorSRGB>
            <cc:ReflectanceSpectrum ColorSpecification="CSI" StartWL="380">
              0.0394959 0.041798 0.0431796 0.0443822 0.0390338
              0.0363864 0.0401547 0.045801 0.0523042 0.0586208
              0.0632642 0.0662882 0.0659939 0.0596725 0.0527806
              0.0512717 0.0512901 0.0460535 0.040967 0.0456935
              0.072808 0.1577058 0.3328304 0.5322706 0.6631728
              0.735719 0.7882051 0.8269124 0.8502781 0.8555662
              0.8545514
            </cc:ReflectanceSpectrum>
          </cc:ColorValues>
        </cc:Object>
      </cc:ObjectCollection>
      <cc:ColorSpecificationCollection>
    </cc:Resources>
  </cc:CxF>
</CxFReferenceData>
```

FIG. 6

```
• <SamplingPositionImageData>
    - <PositionLocationImage Id="IT82" ImageLink="IT8SpotColorRed.jpg"/>
    - <PositionLocationImage Id="P2P1" ImageLink="P2PPosition1.jpg"/>
    - <PositionLocationImage Id="CP1"
      ImageLink="https://www.jupitercandy.com/sampling/ColorPosition1.jpg"/>
    - <PositionLocationImage Id="BC2" ImageLink="barcode.pdf">
    - <PositionLocationImage Id="QR1" ImageLink="QRCode.pdf">
• </SamplingPositionImageData>
```

FIG. 9

```
<ColorParameter>
  <ParameterName>SpotColorRed</ParameterName>
  <SamplingPosition>
    <SamplingPositionMatrix>
      <UoM>mm</UoM>
      <Origin>BL</Origin>
      <PositionDefinition PositionLabel="BottomMark">
        <XPosition>112</XPosition>
        <YPosition>200</YPosition>
      </PositionDefinition>
    </SamplingPositionMatrix>
  </SamplingPosition>
  <ChartType>IT8.7/1</ChartType>
  <CxFReferenceObjectIdLink>
    CxF002
  </CxFReferenceObjectIdLink>
</ColorParameter>
```

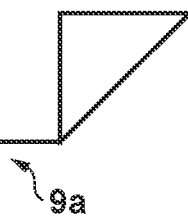
9a

```
<BarcodeParameter>
  <BarcodeSymbology>QRcode</BarcodeSymbology>
  <SamplingPosition>
    <SamplingPositionImageIdLink>
      QR1
    </SamplingPositionImageIdLink>
  </SamplingPosition>
</BarcodeParameter>
```

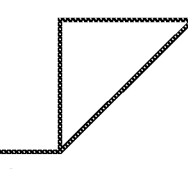
9b

INFORMATION PROCESSING APPARATUS, CONTROL METHOD OF THE SAME, AND STORAGE MEDIUM

BACKGROUND OF THE INVENTION

Field of the Invention

The present invention relates to an information processing apparatus for managing print product quality, a control method of the same, and a storage medium.

Description of the Related Art

There are print service formats called print on demand (POD), production printing, and commercial printing. In these service formats, there is a customer (also referred to as an end user) who orders or requests printing) and a printing company that provides a print product, and the customer orders the print product by providing the printing company with a specification of the print product that the customer is requesting, and if necessary, image data used in printing. The specification of the print product is an element that decides the print product content such as a type of sheet to use, a finishing setting like binding and stapling, or a number of sheets or copies to be printed. The printing company uses the requested content and image data, creates the print product, then delivers it to the customer.

In these commercial printing services, the printing company uses various devices and software in everything from receiving orders to delivering a print product. In addition to a printing apparatus for printing on a sheet, a finisher for binding/stapling, and an inspection apparatus for examining/inspecting a print product being used, a web server for receiving an order for a print product from a customer and a terminal and software for managing print product production are also used. Also, there are a plurality of users of these devices and software. For example, an order receiver who manages orders and contacts customers, a process designer who designs operation processes for completing print products, an operator who operates printing or inspection apparatuses, and a checker who checks the quality of the final print product. There are printing companies that have a plurality of production sites, and in such a case, the printing companies, based on order content, decide at which production site to produce print products.

In commercial printing services, the printing companies are often assigned quality conditions for print products by the customers. The quality conditions are different from the specifications of print products, and indicate conditions related to the quality of print products such as a position deviation amount of an image between the front and back side of a sheet or an amount of variation in a color values of an image across a plurality of copies or pages. There are various print products such as distribution items like flyers and pamphlets, photo albums, books, business cards, and exhibition panels, and because their uses and prices vary, their quality conditions also vary in their required conditions and standards. As described later, because the printing companies, regarding the quality conditions, need an operation process for satisfying those conditions and a process for checking the quality of print products, generally, the higher the quality condition standard, the higher the cost of print products. The printing companies generate print products while performing various adjustment operations to satisfy these quality conditions. For example, all sorts of adjustments are made on a printing apparatus for matching a specific color on a specific sheet and print products that do not meet the quality conditions are removed as a defective product in the post-print inspection based a sample printing result for which a customer's agreement has been obtained. The printing companies, through these operations, confirm whether the quality of print products that was achieved satisfies the quality conditions that the customers are seeking.

Particularly, when receiving orders for print products with various specifications/quality conditions from many customers, there will also be many kinds of operations for satisfying the quality conditions of the customers for each print product, and an amount of time required will be long. For example, it is assumed that a print product A is required to not have print misalignment between the front and back sides and a print product B is required to have consistency with a color sample provided by a customer as quality conditions. In this case, an order receiver needs to send each print product quality condition to a process designer using a data format that is used in the printing company. The process designer, based on a type and state of printing apparatuses and software that can be used in the printing company, decides an operation process for satisfying the quality condition in the production of each print product. Operations are decided so that for example, for the print product A, a device of the post-processing apparatus is adjusted and for the print product B, a printing apparatus is color-proofed, and additionally, result confirmation operations for each operation such as post-color-proofing colorimetry are decided. Also, means for confirming the quality, which indicate how to confirm whether the produced print products satisfy the quality conditions is decided, such as a portion on which to confirm print misalignment between the front and back sides and a maximum value of a permitted misalignment amount. Generally, a plurality of printing apparatuses are used in printing companies, so a process designer needs to choose the most appropriate apparatus from the plurality of printing apparatuses in order to satisfy the quality conditions of print products for which orders were received. As described above, a production of print products that satisfy the quality conditions and a definition of a workflow for checking the quality of the produced print products are necessary in a printing company. An operator receives the operation process decided as described above, then performs an operation of the printing apparatus and the software. A checker checks the produced print product and whether the print product satisfies the quality conditions based on the means for confirming the quality. As described above, the printing companies spend a lot of man-hours on quality conditions and the operation processes for satisfying those conditions.

Conventionally, a unified information format had not been defined or used for when customers and printing companies send and receive quality conditions. Thus, the printing companies would receive the quality conditions in different information formats from a plurality of customers, and inconvenience would arise when operation processes were being designed from the quality conditions to satisfy the conditions. Even from the customer-side perspective, it was complicated to send the quality conditions in different information formats when placing an order for print products to a plurality of printing companies.

Accordingly, in order to unify the information format for transmitting quality conditions, a PRX has been considered as a standardization technology. The PRX stands for a print requirement exchange format and indicates a standardized data format for quality conditions required for printing. By using the PRX, the quality conditions for different customers or different orders can be written in a unified and standardized data format. As described above, quality conditions which were conventionally not unified will be enabled for transmission in a unified information format using the PRX.

By using the PRX that describes the quality conditions that customers are seeking, the operation process performed when producing print products for satisfying the quality conditions and the operation process for checking the quality of the print products can be established in a printing system without an intervention by the operator. In other words, presetting of printing apparatuses and software can be performed automatically.

Japanese Patent Laid-Open No. 2014-215953 proposes a mechanism that sets a printing condition for contents viewed by a content viewer according to the printing conditions that a registrant of the content has set. In this case, if the printing conditions set by the registrant are satisfied, the print job is inputted to a predetermined printing apparatus.

However, there is a problem in the foregoing conventional technique as is described below. The quality conditions for print products described earlier are of a variety depending on the customer or the print product, and therefore, there may be many methods for achieving them. For example, as a quality condition, it is assumed that a customer has requested a high level of color reproducibility and stability regarding a corporate color used in a corporate logo. Color reproducibility is a scale for indicating whether colors expressed in definitions such as RGB or CMYK in print data provided by the customer are printed in the same color on the print product. Stability is a scale for indicating whether the print data whose color is the same has been printed without a change in its color across the print product when printing a plurality of pages or copies. Because corporate colors are colors that symbolize a company/organization, the customers often request high color reproducibility and stability as a quality condition, in other words, that the color is printed in the same color as the print data provided by the customer and that the result does not change in any page.

As described above, the operation process for satisfying the quality condition requested by customers varies depending on the print product specifications and the quality conditions requested by the customers. Using the PRX format described earlier, it becomes possible to input quality requirements for print product orders received from customers for every print job order received in a digital format. However, in cases where customers assign quality requirements in a PRX for print products, there may be cases where inconsistencies may occur between print data objects and their corresponding quality requirements. For example, a case in which print data was revised in the process of proofreading the print data, but the change of the PRX was forgotten may occur. Here, a case in which in spite of the printing quality standard for a spot color being described in the PRX, a corresponding object does not exist in the print data may occur. For example, there may be cases where an object in the print data is removed or position information of the object in the print data is changed, or if it is a color, a spot color designation is missed.

As described above, if inconsistencies occur between the print data and PRX, for example, a case where there is a printing quality standard in the PRX but a corresponding object does not exist in the print data, the quality requirements of customers cannot be reflected appropriately.

SUMMARY OF THE INVENTION

The present invention enables realization of a mechanism configured to detect and give a warning for an inconsistency between an assigned quality condition and a corresponding print data in a print job.

One aspect of the present invention provides an information processing apparatus comprising: at least one memory device that stores a set of instructions; and at least one processor that executes the set of instructions to: interpret quality requirement data of a print job received from an external; analyze print data of the print job; compare a result of interpreting the quality requirement data and a result of analyzing the print data; and based on a result of the comparison, in a case where an object comprised in a print image corresponding to the quality requirement data of the print job is not present in the print data, display a warning screen on a display unit.

Another aspect of the present invention provides a method for controlling an information processing apparatus, the method comprising: interpreting quality requirement data of a print job received from an external; analyzing print data of the print job; comparing a result of interpreting the quality requirement data and a result of analyzing the print data; and in a case where an object comprised in a print image corresponding to the quality requirement data of the print job is not present in the print data as a result of the comparison, displaying a warning screen on a display unit.

Still another aspect of the present invention provides a non-transitory computer-readable storage medium storing a computer program for causing a computer to execute each step of a control method for an information processing apparatus, the method comprising: interpreting quality requirement data of a print job received from an external; analyzing print data of the print job; comparing a result of interpreting the quality requirement data and a result of analyzing the print data; and in a case where an object comprised in a print image corresponding to the quality requirement data of the print job is not present in the print data as a result of the comparison, displaying a warning screen on a display unit.

Yet still another aspect of the present invention provides an information processing apparatus comprising: at least one memory device that stores a set of instructions; and at least one processor that executes the set of instructions to: interpret quality requirement data of a print job received from an external; analyze print data of the print job; compare a result of interpreting the quality requirement data and a result of analyzing the print data; and as a result of the comparison in a case where the quality requirement data of the print job and the print data are inconsistent, displays a warning screen on a display unit.

Further features of the present invention will become apparent from the following description of exemplary embodiments (with reference to the attached drawings).

BRIEF DESCRIPTION OF THE DRAWINGS

FIG. 4 is a diagram of a quality requirement parameter of a PRX analysis result according to the embodiment.

FIG. 5 is a diagram of object color information of the PRX analysis result according to the embodiment.

FIG. 6 is a diagram of position information of the PRX analysis result according to the embodiment.

FIG. 9 is a diagram of a post-change PRX position information parameter according to the embodiment.

DESCRIPTION OF THE EMBODIMENTS

Figure 1:
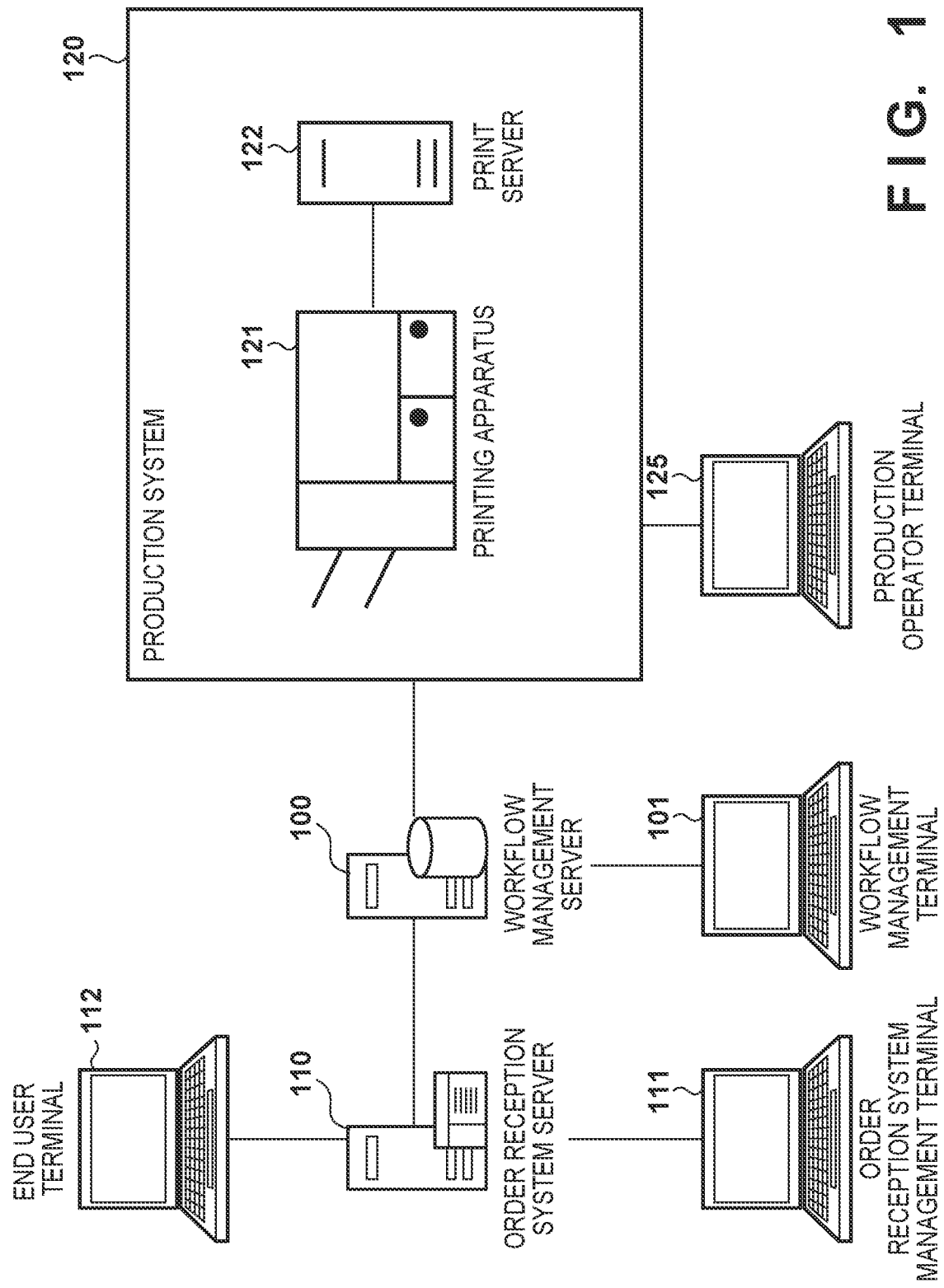
FIG. 1 is a diagram illustrating a configuration example of a system according to an embodiment.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

Note that a multi function peripheral (digital multi-function peripheral/MFP) will be described as an example of an image formation apparatus according to the embodiment. However, a scope of application is not limited to a multi function peripheral and may be any image formation apparatus comprising a printing function.

System Configuration

Hereinafter, an embodiment of the present invention will be described. First, with reference to FIG. 1, a commercial printing system configuration according to the present embodiment will be described. This commercial printing system is configured comprising a workflow management server 100, a workflow management terminal 101, an order reception system server 110, an order reception system management terminal 111, an end user terminal 112, a production system (printing system) 120, and a production operator terminal 125.

The workflow management server 100 is an apparatus for managing an overall workflow related to commercial printing goods. The workflow management server 100 receives PRX data, which is print data and quality condition information, from the order reception system server 110. The PRX stands for a print requirement exchange format and indicates a standardized data format for quality conditions required for printing. The PRX has been considered as a standardization technology in order to unify the information format for transmitting quality conditions. By using the PRX, the quality conditions for different customers or different orders can be written in a unified and standardized data format. As described above, quality conditions which were conventionally not unified will be enabled for transmission in a unified information format using the PRX.

By using the PRX that describes the quality conditions that customers are seeking, the operation process performed when producing print products for satisfying the quality conditions and the operation process for checking the quality of the print products can be established in a printing system without an intervention by the operator. In other words, presetting of printing apparatuses and software can be performed automatically. Then, the workflow management server 100 interprets the PRX data received from the order reception system server 110, and then for every order job, decides the production system 120, executes print data prepress processing, and such. Also, the workflow management server 100 generates data (print data, job ticket, operation setting information, control instruction, etc.) to be processed in the production system 120 then sends it to each device comprised by the production system 120. As for devices comprised by the production system 120, they will be described later. Note that in the present embodiment, the workflow management server 100 is described with an assumption that it is an on-premises server placed at a site that performs workflow management; however, limitation is not made to this. As another embodiment, the workflow management server 100 may be configured to be constructed as a cloud server then be connected via the Internet from the workflow management terminal 101 described later. The same applies to the order reception system server 110 described later. Note that in the present embodiment, the workflow management server 100 is described with an assumption that it executes a PRX interpretation and print data preflighting (pre-print data check); however, limitation is not made to this. As another embodiment, the execution may be performed by the order reception system server 110 described later or a print server 122 of the production system 120 described later.

The workflow management terminal 101 is a terminal that is operated by a workflow administrator that executes various functions by connecting to the workflow management server 100 via a network, and that receives and displays information from the workflow management server 100. More specifically, the workflow management terminal 101 changes a workflow management function setting, confirms a state of the production system 120 device, displays information related to the inconsistency between the print data and the PRX, and such. An order reception system server (order intake server) 110 is an apparatus for managing a system for receiving orders from an end user related to commercial printing goods. The order reception system server 110 generates print data and a PRX based on product for which an order is received or the content of orders from an end user then sends them to the workflow management server 100.

The order reception system management terminal 111 is a terminal operated by an order reception system administrator and connects to the order reception system server 110 via a network, and then executes each function. The functions comprise functions for setting a goods-specific requested quality, confirming the status for every order job, and viewing product quality information for every order job, and the like The end user terminal 112 is a terminal operated by an end user and connects to the order reception system server 110 via a network. Then, via a UI such as a web browser, instructions such as a goods selection, document data transmission, or order placement from an end user is accepted then sent to the order reception system server 110.

The production system 120 is a system for producing goods (products) in commercial printing. Specifically, the production system 120 is configured comprising a printing apparatus 121 and the print server 122. Note that although the invention is explained here with such a configuration as an example of a production system, there is no intent to limit the invention. For example, the present production system may be configured comprising another apparatus or may be configured so that the printing apparatus comprises all apparatuses. The printing apparatus 121 is an apparatus for executing printing processing based on data and an instruction from the workflow management server 100. No particular limitation is made to a printing method, and the method may be an electrographic method, an inkjet method, or any other method. An administrator or an operator of the production system 120 is able to instruct control related to printing via a UI of the printing apparatus 121. The print server 122 is a server for controlling the printing apparatus 121. Similarly to a typical printing system, the administrator or the operator of the production system 120 is able to instruct control related to printing via an UI of the print server 122. The production operator terminal 125 is an apparatus used by the operator who operates all sorts of devices of the production system 120 described above. The apparatus comprises functions such as confirming the operation state of devices or confirming error information when an error occurs. As another form, a configuration may be taken so that a UI operation unit comprised by each device rather than an external terminal is responsible for these functions.

Hardware Configuration of Each Apparatus

Figure 2:
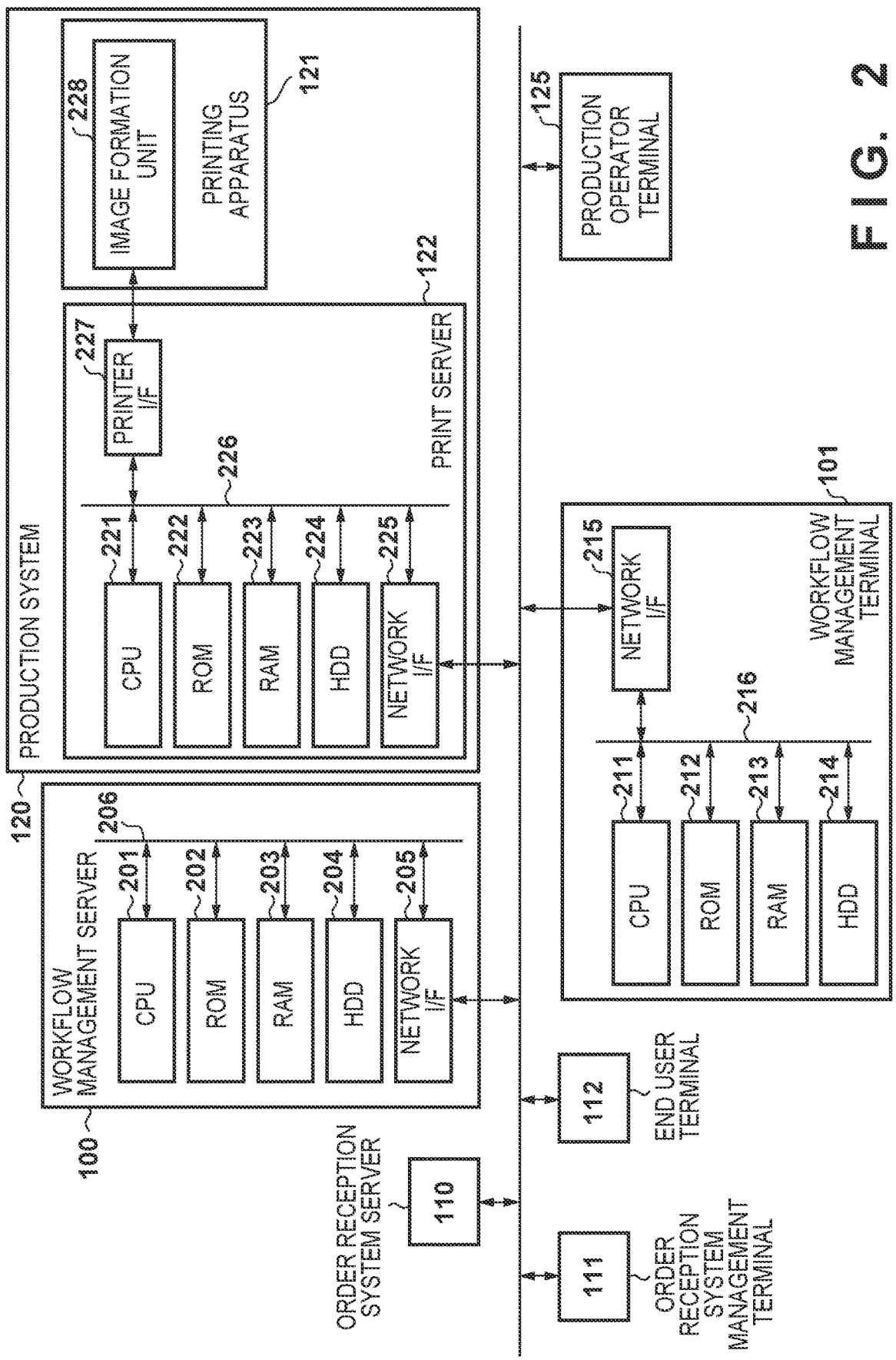
FIG. 2 is a diagram illustrating a configuration example of hardware according to the embodiment.

Next, with reference to FIG. 2, a hardware configuration of each apparatus according to the present embodiment will be described. FIG. 2 illustrates a hardware configuration of a workflow management system comprising the workflow management server 100 and the workflow management terminal 101 according to the present embodiment.

First, a hardware configuration of the workflow management server 100 will be explained. The workflow management server 100 comprises a CPU 201, a ROM 202, a RAM 203, an HDD 204, and a network I/F 205. The CPU 201 deploys in the RAM 203 a control program stored in the ROM 202 or the hard disk (HDD) 204, executes that deployed program, and collectively controls access to all sorts of devices connected to a system bus 206. The ROM 202 stores, for example, the control program that the CPU 201 is able to execute. The RAM 203 mainly functions as a main memory, a work area, or the like, of the CPU 201 and is configured such that a memory capacity can be extended by an option RAM 203 connected to an expansion port (not shown). The hard disk drive (HDD) 204 stores a boot program, all sorts of applications, font data, a user file, and an edit file. Note that although the HDD 204 was used in the present embodiment, an SD card, a flash memory, an SSD, an eMMC, or the like may be used as an external storage unit besides the HDD. The same applies to apparatuses comprising an HDD described hereinafter. The network I/F 205 performs data communication with all sorts of apparatuses, which are external apparatuses, via the network. Note that because the hardware configuration in a case where the order reception system server 110 is the same as that of the workflow management server 100, the description will be omitted.

Next, a hardware configuration of the workflow management terminal 101 will be explained. The workflow management terminal 101 comprises a CPU 211, a ROM 212, a RAM 213, an HDD 214, and a network I/F 215. The CPU 211 deploys in the RAM 213 a control program stored in the ROM 212 or the hard disk (HDD) 214, executes that deployed program, and collectively controls access to all sorts of devices connected to a system bus 216. The ROM 212 stores, for example, the control program that the CPU 211 is able to execute. The RAM 213 mainly functions as a main memory, a work area, or the like, of the CPU 211 and is configured such that a memory capacity can be extended by an option RAM 213 connected to an expansion port (not shown). The hard disk drive (HDD) 214 stores a boot program, all sorts of applications, font data, a user file, and an edit file. The network I/F 215 performs data communication with other apparatuses via the network. Note that because the hardware configuration of other terminal apparatuses such as the order reception system management terminal 111, the end user terminal 112, and the production operator terminal 125 are the same as that of the workflow management terminal 101, the description will be omitted.

Next, a hardware configuration of the production system 120 will be explained. The production system 120 is configured comprising the printing apparatus 121 and the print server 122 as described above. The printing apparatus 121 comprises an image formation unit. Also, the print server 122 comprises a CPU 221, a ROM 222, a RAM 223, an HDD 224, and a network I/F 225.

The CPU 221 deploys in the RAM 223 a control program stored in the ROM 222 or the hard disk (HDD) 224, executes that deployed program, and collectively controls access to all sorts of devices connected to a system bus 226. The ROM 222 mainly stores, for example, the control program that the CPU 221 is able to execute. The RAM 223 mainly functions as a main memory, a work area, or the like, of the CPU 221 and is configured such that a memory capacity can be extended by an option RAM connected to an expansion port (not shown). The hard disk (HDD) 224 stores a boot program, all sorts of applications, font data, a user file, and an edit file, and the network I/F 225 performs data communication with other apparatuses via the network.

A printer I/F 227 controls an image output of the printing apparatus 121 to an image formation unit 228. The image formation unit 228 outputs print data on a sheet. Note that the printing apparatus 121 may comprise a post-processing apparatus for performing stapling processing or folding processing to a print product outputted by the image formation unit 228 or an inspection apparatus for performing an inspection of the print product.

Software Configuration of Workflow Management Server

Figure 3:
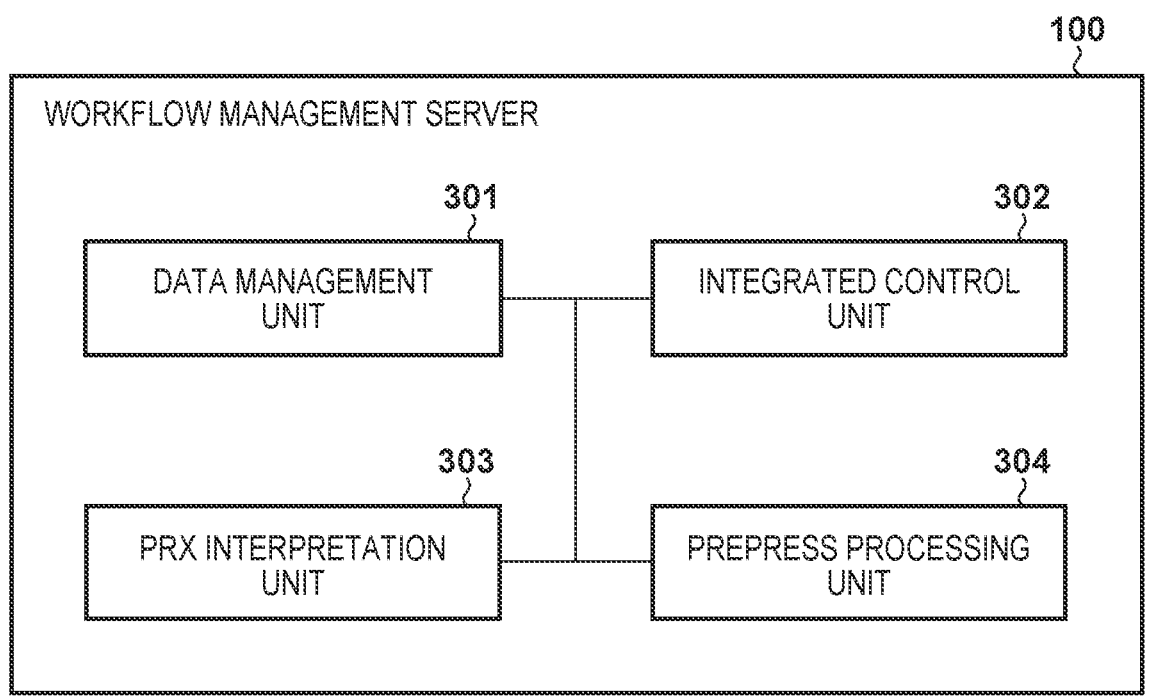
FIG. 3 is a diagram illustrating a configuration example of software according to the embodiment.

Next, an example of a software configuration of the workflow management server 100 according to the present embodiment will be explained with reference to FIG. 3. These software modules are stored in the HDD 204 as programs and are implemented by the CPU 201 deploying and executing the programs in the RAM 203.

The workflow management server 100 comprises a data management unit 301, an integrated control unit 302, a PRX interpretation unit 303, and a prepress processing unit 304 as a software configuration. The data management unit 301 receives the print data and the PRX data from the order reception system server 110. It also executes a rewriting of the PRX and a storing of a change log of the PRX in the HDD 204 which are described later. The PRX interpretation unit 303 analyzes the PRX data received from the order reception system server 110, and then specifies a printing quality condition for the print job. Results obtained from the analysis by the PRX interpretation unit 303 are described later. The prepress processing unit 304 analyzes the print data of the print job. Results obtained from the analysis by the prepress processing unit 304 are described later. The integrated control unit 302 reads a PRX analysis result of the PRX interpretation unit 303 and a print data analysis result of the prepress processing unit 304, and then compares the PRX and print data analysis results to determine whether there is any inconsistency. In the present embodiment, as described in detail below, an example in which if an object corresponding to the print job quality requirement data (PRX) comprising the print image does not exist in the print data, it is determined to be inconsistent will be described. However, this is an example for explaining the invention, and other determination criteria may be used to determine inconsistencies.

Note that in the present embodiment, the workflow management server 100 is described with an assumption that it comprises the PRX interpretation unit 303 and the prepress processing unit 304 that executes print data preflighting; however, limitation is not made to this. As another embodiment, the order reception system server 110 or the print server 122 of the production system 120 may comprise these software configurations.

PRX Analysis Results

Next, the PRX analysis result by the PRX interpretation unit 303 according to the present embodiment will be explained with reference to FIG. 4. FIG. 4 indicates an example of a parameter in which quality requirements related to an object in the print data are described. An object in the print data indicates a predetermined image comprised in the print image if printed according to the print data. For example, it is a corporate logo, a barcode, or the like comprised in the print image. The PRX interpretation unit 303, as described below, extracts necessary portions from the PRX, and then performs an analysis.

4a of FIG. 4, as an example related to colors, illustrates a case where the end user has specified a quality requirement regarding a spot color defined as "SpotColorRed" using the PRX. ColorParameter is configured from a field which defines a parameter for a quality requirement related to colors. ParameterName represents a name of the quality requirement. SamplingPosition represents position information of an object in the print data, and here, the position information is represented by SamplingPositionMatrix which is a coordinate value in the print data. ChartType represents a category of a color chart to reference for when measuring a color. CxFReferenceObjectIdLink uses an ID to represent a link to a data set which represents target color information of the object. FIG. 5 illustrates a data set associated by CxFReferenceObjectIdLink, and the color information associated with CxFReferenceObjectIdLink=CxF002 is ObjectName="2".

4b of FIG. 4, as an example related to barcodes, illustrates a case where the end user has specified a quality requirement regarding a barcode defined as "QRcode" using the PRX. BarcodeParameter represents a name of a quality requirement related to a "barcode". BarcodeSymbology represents a barcode type of an object. SamplingPosition represents position information of an object in the print data, and here, an object image information data set is represented by SamplingPositionImageIdLink which is an ID. FIG. 6 is a data set associated by SamplingPositionImageIdLink. The image information associated with SamplingPositionImageIdLink=BC2 is "barcode.pdf".

Also, as a result of analyzing the print data in the prepress processing unit 304, in a case of a spot color, the position information, name of the spot color, and a Lab value of the object can be obtained. Also, in a case where a barcode is embedded as a font, a barcode type can be obtained by a barcode font. In a case of barcode objects, the barcode type can be obtained by a tag associated with the object.

Figure 7A:
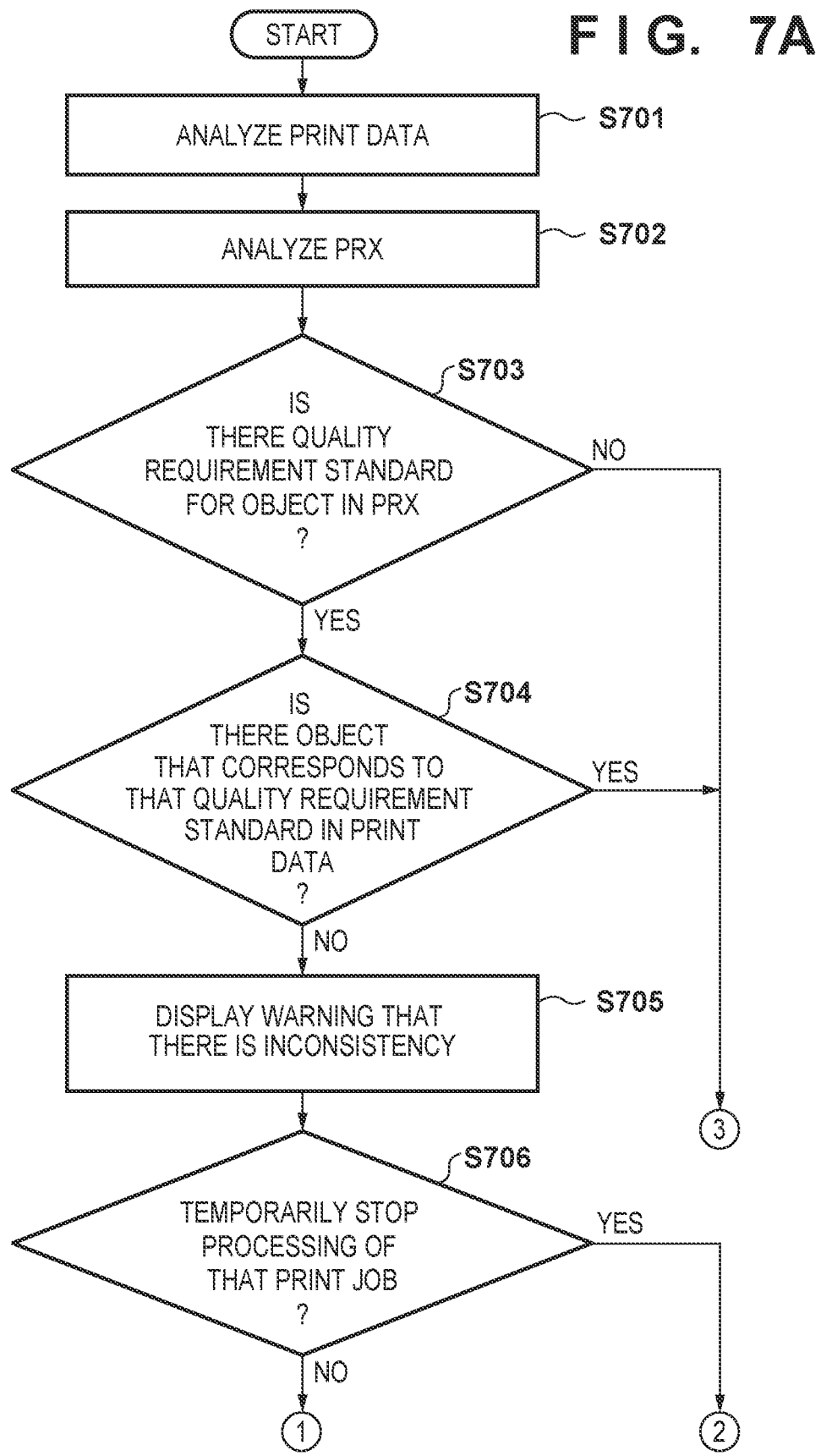
FIGS. 7A and 7B are a flowchart according to the embodiment.
Figure 7B:
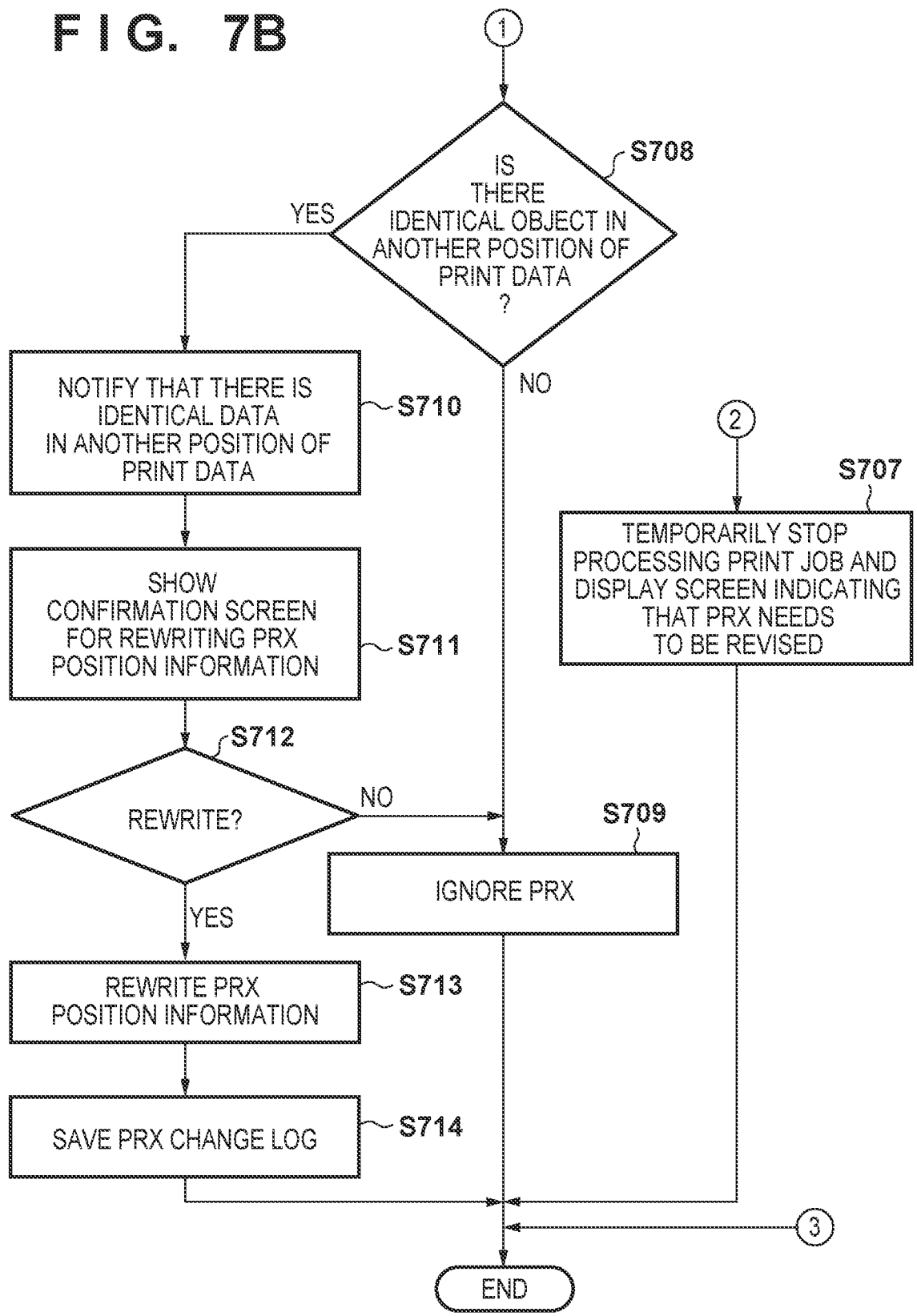

Color: Comparing Print Data Analysis Result Corresponding to PRX Analysis Result Next, a processing procedure of the workflow management server 100 according to the present embodiment will be explained with reference to FIGS. 7A-7B. First, processing for comparing the PRX and print data analysis results for a case where there is a quality requirement description for the object related to the "color" illustrated in 4a of FIG. 4 in the PRX will be explained. The processing explained below is achieved, for example, by the CPU 201 of the workflow management server 100 reading and then executing a control program stored in the ROM 202 or the HDD 204 on the RAM 203. Also, the present flowchart starts the processing when the data management unit 301 receives the PRX and print data from the order reception system server 110.

In step S701, the integrated control unit 302 sends the print data received by the data management unit 301 to the prepress processing unit 304, and then sends the PRX to the PRX interpretation unit 303. The prepress processing unit 304 analyzes the print job (print data), and then sends the analysis result to the data management unit 301. In step S702, the PRX interpretation unit 303 analyzes the PRX, and then sends the analysis result to the data management unit 301. Then, in step S703, the integrated control unit 302 reads the PRX analysis result from the data management unit 301 that received the print data and PRX analysis results, and then determines whether there is a quality requirement standard. Specifically, the integrated control unit 302, by determining whether there is a ColorParameter description in the PRX analysis result, determines whether there is a description of the quality requirement standard regarding the color for the object in the print data.

In a case (S703: N) where it is determined that there is no description of the quality requirement standard, the processing of the present flowchart ends. On the other hand, in a case (S703: Y) where it is determined that there is description of the quality requirement standard, the processing proceeds to S704. In step S704, the integrated control unit 302 determines whether the object corresponding to the quality requirement standard indicated by the PRX which was analyzed in step S702 is comprised in the print data analyzed in step S701. Specifically, the integrated control unit 302 reads the PRX analysis result (ColorParameter) from the data management unit 301 then obtains the content of that ColorParameter. Also, the integrated control unit 302 obtains the target color information ID indicated by CxFReferenceObjectIdLink in ColorParameter then obtains the Lab value in CxFReferenceData associated with the ID. That is, the integrated control unit 302 obtains a parameter such as the color information and position information of the object related to the quality requirement standard of color from the PRX. Additionally, the integrated control unit 302 reads the print data analysis result then obtains the color information Lab value of the corresponding object. Additionally, the integrated control unit 302, by performing a comparison of the PRX analysis result Lab value and the Lab value of the corresponding object from the analysis result of predetermined location of the print data, performs the above determination. Here, the predetermined position, for example, indicates a position indicated by the position information of the object (target of a spot color) assigned by the above SamplingPosition in the PRX of an image of the object in the print image formed when printed. In other words, whether or not print data corresponding to the target object in the position assigned by the PRX is present is determined.

In a case (S704: Y) where the compared results match and it is determined that the object corresponds, in other words, it is determined that there is no inconsistency between the PRX which is the quality requirement standard and the print data, then the processing of the present flowchart ends. On the other hand, in a case (S704: N) where the object is determined to not correspond, in other words, in a case where there is an inconsistency between the PRX which is the quality requirement standard and the print data, the processing advances to step S705, then the integrated control unit 302 gives a warning to the operator about the inconsistency. Specifically, the integrated control unit 302 sends the PRX analysis result for the inconsistent object from the data management unit 301 to the workflow management terminal 101. The workflow management terminal 101 displays a warning screen 810 illustrated in FIG. 8 on a display unit of the workflow management terminal 101. The warning screen 810 displays "stop print job" 801 and "continue print job" 802 so the operator of the workflow management terminal 101 can select them. Next, in step S706, the integrated control unit 302 determines whether to temporarily stop the processing of the print job, in other words, whether or not "stop print job" 801 was selected via the warning screen 810.

In a case (S706: Y) where "stop print job" 801 is selected, the processing advances to step S707, and the integrated control unit 302 pauses the print job processing, displays a screen 820 illustrated in FIG. 8 indicating that the PRX needs to be revised, then ends the processing of the present flowchart. On the other hand, in a case (S706: N) where "continue print job" 802 is selected, the processing advances to step S708, and the integrated control unit 302 compares the Lab value of the PRX analysis result obtained in step S704 and the Lab value of each object in the print data analysis result by the data management unit 301. Additionally, the integrated control unit 302 searches whether or not an identical object is present in a different location of the print data as a result of a comparison.

Figure 8:
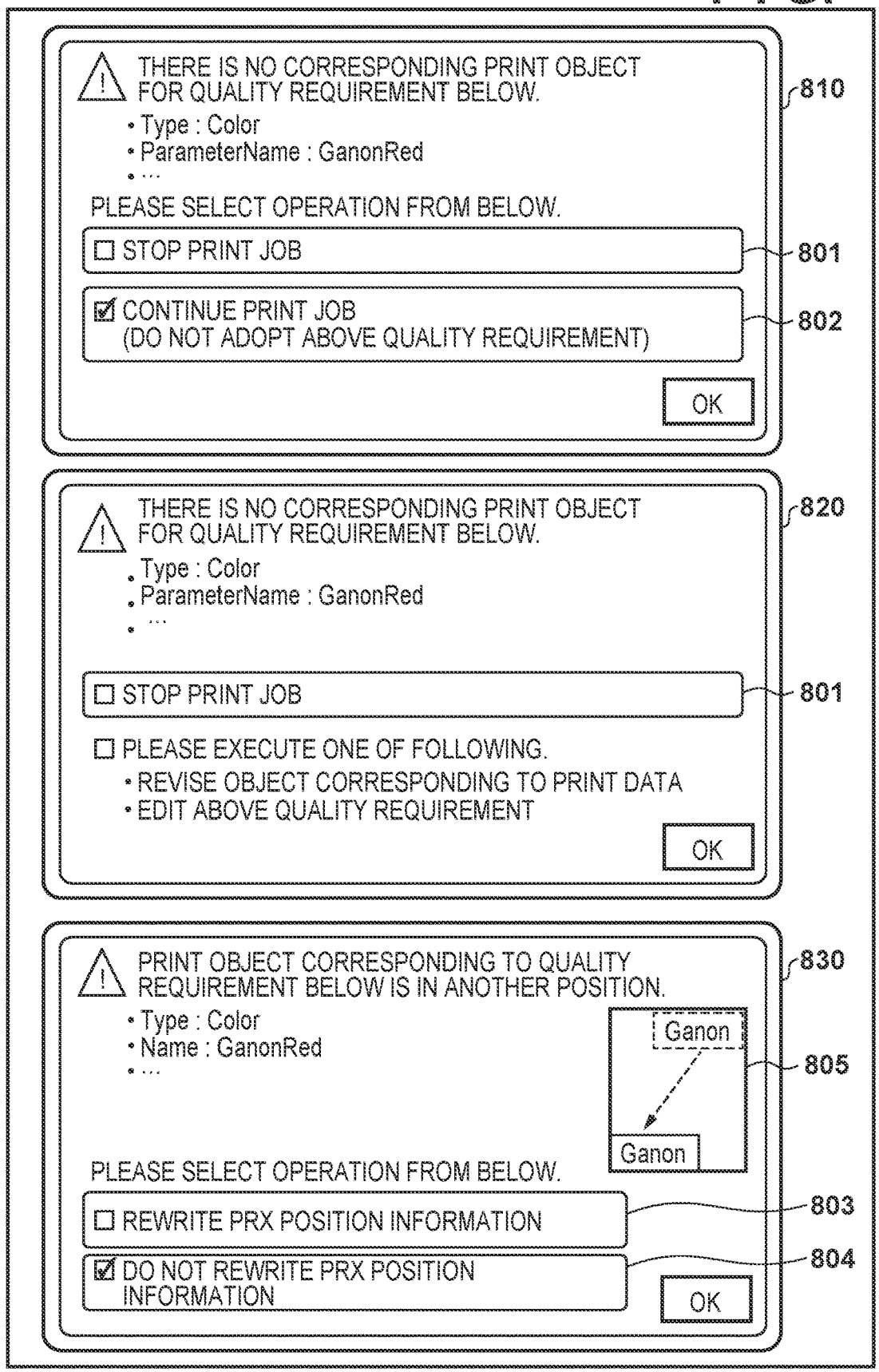
FIG. 8 is a diagram of a workflow management terminal UI according to the embodiment.

In a case (S708: N) where there is no identical object, the processing advances to step S709, and the integrated control unit 302 reads the PRX analysis result of the data management unit 301, discards the PRX corresponding to the object in which inconsistency is occurring, then ends the present flowchart processing. On the other hand, in a case (S708: Y) where there is an identical object, the processing advances to step S710, and the integrated control unit 302 notifies the workflow management terminal 101 that there is an identical object in a different position of the print data. The notification may be displayed in a confirmation screen 830 which will be displayed next or temporarily displayed in a pop-up screen then transition to be displayed in the confirmation screen 830. Next, in step S711, the integrated control unit 302 displays a PRX position information rewrite confirmation screen 830 illustrated in FIG. 8 on the display unit. The confirmation screen 830, as illustrated in FIG. 8, displays "rewrite PRX position information" 803 and "do not rewrite PRX position information" 804 so that they can be selected and also displays a modified position 805 of the object if the PRX position information is rewritten. The modified position 805 illustrates that a position (dashed-line) of the object indicated by the PRX will be changed to a position (where the arrow points) of the object that corresponds to the print data. The operator of the workflow management terminal 101 can confirm the modified position 805 and then select whether or not to rewrite the PRX. In step S712, the integrated control unit 302 determines whether or not the operator of the workflow management terminal 101 has selected to rewrite the PRX position information.

In a case (S712: N) where "do not rewrite PRX position information" 804 is selected, the processing advances to step S709, and the integrated control unit 302 reads the PRX analysis result of the data management unit 301, discards the PRX corresponding to the object in which inconsistency is occurring. Then, the processing of the present flowchart is ended. On the other hand, in a case (S712: Y) where "rewrite PRX position information" 803 is selected, the processing advances to step S713, and the integrated control unit 302 rewrites the PRX position information. Specifically, the integrated control unit 302 reads the PRX analysis result of the data management unit 301 then obtains the position information, for example, the location, (X, Y)=(112, 200), of the identical object in the print data detected in step S708. Additionally, the integrated control unit 302 rewrites SamplingPosition, which is the original data in 4a of FIG. 4 as illustrated in 9a of FIG. 9. Note that the integrated control unit 302 does not need to obtain the position information again in step S713 if it has previously obtained the PRX or print data position information in order to display the modified position 805. Next, in step S714, the integrated control unit 302 associates the history of the PRX that has been changed in the sequence of operations with the print data, stores it in the HDD 204, then ends the processing of the present flowchart.

Barcode: Comparing Print Data Analysis Result Corresponding to PRX Analysis Result Next, processing for comparing the PRX and print data analysis results for a case where there is a quality requirement description for the object related to the "barcode" illustrated in 4b of FIG. 4 in the PRX will be explained, once again with reference to the flowchart in FIGS. 7A-7B. The processing explained below is achieved, for example, by the CPU 201 of the workflow management server 100 reading and then executing a control program stored in the ROM 202 or the HDD 204 on the RAM 203. Also, the present flowchart starts the processing when the data management unit 301 receives the PRX and print data from the order reception system server 110.

In step S701, the integrated control unit 302 sends the print data received by the data management unit 301 to the prepress processing unit 304, and then sends the PRX to the PRX interpretation unit 303. The prepress processing unit 304 analyzes the print job (print data), and then sends the analysis result to the data management unit 301. In step S702, the PRX interpretation unit 303 analyzes the PRX, and then sends the analysis result to the data management unit 301. Then, in step S703, the integrated control unit 302 reads the PRX analysis result from the data management unit 301 that received the print data and PRX analysis results, and then determines whether there is a quality requirement standard. Specifically, the integrated control unit 302, by determining whether there is a BarcodeParameter description in the PRX analysis result, determines whether there is a description of the quality requirement standard regarding the barcode object in the print data.

In a case (S703: N) where it is determined that there is no description of the quality requirement standard, the processing of the present flowchart ends. On the other hand, in a case (S703: Y) where it is determined that there is description of the quality requirement standard, the processing proceeds to S704. In step S704, the integrated control unit 302 determines whether the object corresponding to the quality requirement standard indicated by the PRX which was analyzed in step S702 is comprised in the print data analyzed in step S701. Specifically, the integrated control unit 302 reads the PRX analysis result (BarcodeParameter) from the data management unit 301 then obtains the barcode type and SamplingPosition information of the object indicated by Barcode Symbology. That is, the integrated control unit 302 obtains a parameter such as the barcode type and position information of the object related to the quality requirement standard of barcode from the PRX. Additionally, the integrated control unit 302 reads the print data analysis result and in a case where the barcode is embedded in a font, barcode type is obtained by classifying the barcode font. In a case where barcodes are object images, the barcode type can be obtained by a tag associated with the object. The obtained PRX barcode type and the print data barcode type are compared. Here, similarly to the description of example in 4a of FIG. 4, whether or not the print data that corresponds to the target object (barcode in the corresponding type) is present in the position assigned by the PRX is determined.

In a case (S704: Y) where the compared results match and it is determined that the object corresponds, in other words, it is determined that there is no inconsistency between the PRX which is the quality requirement standard and the print data, then the processing of the present flowchart ends. On the other hand, in a case (S704: N) where the object is determined to not correspond, in other words, in a case where there is an inconsistency between the PRX which is the quality requirement standard and the print data, the processing advances to step S705, then the integrated control unit 302 gives a warning to the operator about the inconsistency. Specifically, the integrated control unit 302 sends the PRX analysis result for the inconsistent object from the data management unit 301 to the workflow management terminal 101. The workflow management terminal 101 displays the warning screen 810 illustrated in FIG. 8 on a display unit of the workflow management terminal 101. The warning screen 810 displays "stop print job" 801 and "continue print job" 802 so the operator of the workflow management terminal 101 can select them. Next, in step S706, the integrated control unit 302 determines whether to temporarily stop the processing of the print job, in other words, whether or not "stop print job" 801 was selected via the warning screen 810.

In a case (S706: Y) where "stop print job" 801 is selected, the processing advances to step S707, and the integrated control unit 302 pauses the print job processing, displays the screen 820 illustrated in FIG. 8 indicating that the PRX needs to be revised, then ends the processing of the present flowchart. On the other hand, in a case (S706: N) where "continue print job" 802 is selected, the processing advances to step S708. In step S708, the integrated control unit 302 compares BarcodeSymbology, which is the PRX analysis result barcode type that has been obtained in step S704, and the barcode type of each object of the print data analysis result of the data management unit 301. Additionally, the integrated control unit 302 searches whether or not an identical object is present in a different location of the print data as a result of a comparison.

In a case (S708: N) where there is no identical object, the processing advances to step S709, and the integrated control unit 302 reads the PRX analysis result of the data management unit 301, discards the PRX corresponding to the object in which inconsistency is occurring, then ends the present flowchart processing. On the other hand, in a case (S708: Y) where there is an identical object, the processing advances to step S710, and the integrated control unit 302 notifies the workflow management terminal 101 that there is an identical object in a different position of the print data. The notification may be displayed in the confirmation screen 830 which will be displayed next or temporarily displayed in a pop-up screen then transition to be displayed in the confirmation screen 830. Next, in step S711, the integrated control unit 302 displays the PRX position information rewrite confirmation screen 830 illustrated in FIG. 8 on the display unit. The confirmation screen 830, as illustrated in FIG. 8, displays "rewrite PRX position information" 803 and "do not rewrite PRX position information" 804 so that they can be selected and also displays the modified position 805 of the object if the PRX position information is rewritten. The modified position 805 illustrates that a position (dashed-line) of the object indicated by the PRX will be changed to a position (where the arrow points) of the object that corresponds to the print data. The operator of the workflow management terminal 101 can confirm the modified position 805 and then select whether or not to rewrite the PRX. In step S712, the integrated control unit 302 determines whether or not the operator of the workflow management terminal 101 has selected to rewrite the PRX position information.

In a case (S712: N) where "do not rewrite PRX position information" 804 is selected, the processing advances to step S709. In step S709, the integrated control unit 302 reads the PRX analysis result of the data management unit 301, discards the PRX corresponding to the object in which inconsistency is occurring, then ends the present flowchart processing. On the other hand, in a case (S712: Y) where "rewrite PRX position information" 803 is selected, the processing advances to step S713, and the integrated control unit 302 rewrites the PRX position information. Specifically, the integrated control unit 302 reads the PRX analysis result of the data management unit 301 then obtains the position information, for example, PositionLocationImage Id="QR1" in FIG. 6B, of the identical object in the print data detected in step S708. Additionally, the integrated control unit 302 rewrites SamplingPosition, which is the original data in 4b of FIG. 4 as illustrated in 9b of FIG. 9. Note that the integrated control unit 302 does not need to obtain the position information again in step S713 if it has previously obtained the PRX or print data position information in order to display the modified position 805. Next, in step S714, the integrated control unit 302 associates the history of the PRX that has been changed in the sequence of operations with the print data, stores it in the HDD 204, then ends the processing of the present flowchart.

As described above, the information processing apparatus according to the present embodiment interprets the quality requirement data of a print job received externally, analyzes the print data of the print job, then compares the interpretation result of the quality requirement data and the analysis result of the print data. Also, in a case where an object comprised in the print image corresponding to the quality requirement data of the print job is not present in the print data as a result of the comparison, the information processing apparatus displays the warning screen on the display unit. Additionally, whether to stop or continue executing the print job is displayed in the warning screen so the operator of the information processing apparatus can select them. Consequently, by virtue of the present embodiment, the inconsistencies between the quality conditions specified for the print job and the corresponding print data can be detected then warned about. Also, the operator is able to select a subsequent response, thereby enabling to provide a user-friendly operation system.

The present invention is not limited to the foregoing embodiments, and various variations are possible. For example, in the above embodiment, an example was given where the PRX is used as a data format for conveying the quality requirement content of print data; however, there is no intent to limit the present invention. For example, a configuration may be taken so that the quality requirement content is conveyed by a data format such as XJDF (exchange job definition format).

Note that in the above embodiment, the workflow management server 100 was described with an assumption that it executes a PRX interpretation and print data preflighting; however, limitation is not made to this. For example, in another embodiment, there is a case where it is executed by the order reception system server 110. In this case, the display (S706) of the warning screen and the display (S711) of the confirmation screen are both displayed on the order reception system management terminal 111, thereby enabling detection of the inconsistencies earlier and the quick request of the order receiver to review the quality requirement.

Also, in another embodiment, there is a case where it is executed by the print server 122 of the production system 120. In this case, the display (S706) of the warning screen and the display (S711) of the confirmation screen are both displayed on the production operator terminal 125, thereby enabling monitoring of the print job that has inconsistent quality requirements until just before its execution.

By virtue of the present invention, the inconsistencies between the quality conditions specified for the print job and the corresponding print data can be detected then warned about.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-169581 filed on Sep. 18, 2019, which is hereby incorporated by reference herein in its entirety.

What is claimed is:

1. An information processing apparatus comprising:
at least one memory device that stores a set of instructions; and
at least one processor that executes the set of instructions to:
interpret quality requirement data of a print job received externally;
analyze print data of the print job;
compare a result of interpreting the quality requirement data and a result of analyzing the print data; and
based on a result of the comparison, in a case where an object comprised in a print image corresponding to the quality requirement data of the print job is not present in the print data, cause a display to display a warning screen,
wherein in the warning screen, whether to stop or continue an execution of the print job is displayed to be enabled for selection by an operator of the information processing apparatus, and
wherein the at least one processor executes instructions in the memory device to:
in a case where stopping an execution of the print job is selected via the warning screen, cause the display to display that the quality requirement data needs to be revised.

2. The information processing apparatus according to claim 1, wherein
the at least one processor executes instructions in the memory device to:
based on a result of the comparison,
in a case where the corresponding object is present in the print data in a position, in an image to be printed, that is indicated by the quality requirement data of the print job, determine that an object corresponding to the quality requirement data of the print job is present in the print data, and
in a case where the corresponding object is not present in the print data in a position, in the image to be printed, that is indicated by the quality requirement data of the print job, determine that an object corresponding to the quality requirement data of the print job is not present in the print data.

3. The information processing apparatus according to claim 2, wherein
the at least one processor executes instructions in the memory device to:
in the warning screen, when it is selected by the operator to continue an execution of the print job,
in a case where the corresponding object is present in the print data in a different position from the position, cause the display to display a confirmation screen to notify of a result of determining, and
in a case where the corresponding object is not present in the print data in a different position from the position, discard the quality requirement data and continue an execution of the print job.

4. The information processing apparatus according to claim 3, wherein
in the confirmation screen, whether to rewrite the position indicated by the quality requirement data to the different position is displayed to be enabled for selection by an operator of the information processing apparatus.

5. The information processing apparatus according to claim 4, wherein
the at least one processor executes instructions in the memory device to:

in the confirmation screen, when it is selected to rewrite the position indicated by the quality requirement data to the different position, rewrite position information of the quality requirement data with position information of the different position where the object is present in the print data.

6. The information processing apparatus according to claim 4, wherein
the at least one processor executes instructions in the memory device to:
in the confirmation screen, when it is selected to not rewrite the position indicated by the quality requirement data to the different position, discard the quality requirement data and continue execution of the print job.

7. The information processing apparatus according to claim 1, wherein
the quality requirement data is PRX (Print Requirement eXchange format) data.

8. A method for controlling an information processing apparatus, the method comprising:
interpreting quality requirement data of a print job received externally;
analyzing print data of the print job;
comparing a result of interpreting the quality requirement data and a result of analyzing the print data; and
in a case where an object comprised in a print image corresponding to the quality requirement data of the print job is not present in the print data as a result of the comparison, causing a display to display a warning screen,
wherein in the warning screen, displaying whether to stop or continue execution of the print job to enable for selection by an operator of the information processing apparatus, and
wherein in a case where stopping an execution of the print job is selected via the warning screen, causing the display to display that the quality requirement data needs to be revised.

9. A non-transitory computer-readable storage medium storing a computer program for causing a computer to execute each step of a control method for an information processing apparatus, the method comprising:
interpreting quality requirement data of a print job received externally;
analyzing print data of the print job;
comparing a result of interpreting the quality requirement data and a result of analyzing the print data; and
in a case where an object comprised in a print image corresponding to the quality requirement data of the print job is not present in the print data as a result of the comparison, causing a display to display a warning screen,
wherein in the warning screen, displaying whether to stop or continue an execution of the print job to enable for selection by an operator of the information processing apparatus, and
wherein in a case where stopping an execution of the print job is selected via the warning screen, causing the display to display that the quality requirement data needs to be revised.

10. An information processing apparatus comprising:
at least one processor or at least one circuit that causes the information processing apparatus to function as:
a receiving unit that receives print data and quality requirement data of the print data, and
a notification unit that performs a warning notification based on an object described in the quality requirement data of the print data being not present in the print data,
wherein position information indicating a position of the object is further described in the quality requirement data of the print data, and
wherein the notification unit performs the warning notification based on the object described in the quality requirement data of the print data being not present in the position indicated by the position information in the print data.

11. The information processing apparatus according to claim 10, wherein
the warning notification indicates that the object described in the quality requirement data of the print data is not present in the print data.

12. The information processing apparatus according to claim 10, wherein
whether or not to perform the print data is selected by a user after the warning notification is performed.

13. The information processing apparatus according to claim 12, wherein
after it is selected not to perform the print data, the notification unit further performs another warning notification for causing a user to modify the quality requirement data.

14. The information processing apparatus according to claim 10, wherein
the quality requirement data is PRX (Print Requirement eXchange format) data.

15. The information processing apparatus according to claim 14, wherein
the object is a predetermined code.

16. The information processing apparatus according to claim 15, wherein
the predetermined code is a barcode.

17. The information processing apparatus according to claim 14, wherein
a color of the object is further described in the quality requirement data of the print data.

* * * * *